(12) United States Patent
Ahn

(10) Patent No.: US 10,276,903 B2
(45) Date of Patent: Apr. 30, 2019

(54) BATTERY PACK

(71) Applicant: SAMSUNG SDI CO., LTD., Yongin-si, Gyeonggi-do (KR)

(72) Inventor: Jang-Gun Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 563 days.

(21) Appl. No.: 14/616,556

(22) Filed: Feb. 6, 2015

(65) Prior Publication Data
US 2015/0229010 A1    Aug. 13, 2015

(30) Foreign Application Priority Data
Feb. 10, 2014   (KR) ......................... 10-2014-0014800

(51) Int. Cl.
*H01M 2/10*    (2006.01)
*H01M 10/613*    (2014.01)
(Continued)

(52) U.S. Cl.
CPC ..... *H01M 10/6557* (2015.04); *H01M 2/1077* (2013.01); *H01M 10/613* (2015.04);
(Continued)

(58) Field of Classification Search
CPC ............. H01M 2/1223; H01M 2/1229; H01M 2/1235; H01M 2/1241; H01M 2/1276;
(Continued)

(56) References Cited

U.S. PATENT DOCUMENTS

2007/0026303 A1   2/2007 Jeon et al.
2007/0031728 A1*  2/2007 Lee ................. H01M 2/1061
                                                     429/120
(Continued)

FOREIGN PATENT DOCUMENTS

EP   1753068 A1   2/2007
EP   2658008 A1   10/2013
(Continued)

OTHER PUBLICATIONS

Machine translation of JP2008-269985.*
(Continued)

*Primary Examiner* — Eric R Smith
(74) *Attorney, Agent, or Firm* — Lewis Roca Rothgerber Christie LLP

(57) ABSTRACT

A battery pack includes at least one battery module and a housing. The at least one battery module includes a plurality of battery cells arranged along one direction and barriers respectively positioned between adjacent ones of the plurality of battery cells, the plurality of battery cells being electrically coupled to each other. The housing accommodates the battery module therein and has inlets at opposite edges of a first end of the housing at one end of the battery module, and an outlet at a lower portion of a second end of the housing at an opposite end of the battery module. Each barrier includes a base portion facing an adjacent one of the battery cells, an upper spacer at at least one top corner of the base portion, and a lower spacer at at least one bottom corner of the base portion. Sides and a bottom of the battery module are spaced from the housing.

9 Claims, 6 Drawing Sheets

(51) Int. Cl.
  *H01M 10/625* (2014.01)
  *H01M 10/647* (2014.01)
  *H01M 10/652* (2014.01)
  *H01M 10/6557* (2014.01)
  *H01M 10/6566* (2014.01)
  *H01M 10/6568* (2014.01)

(52) U.S. Cl.
  CPC ..... *H01M 10/625* (2015.04); *H01M 10/6566* (2015.04); *H01M 10/6568* (2015.04); *H01M 10/647* (2015.04); *H01M 10/652* (2015.04); *H01M 2220/20* (2013.01)

(58) Field of Classification Search
  CPC ............. H01M 2/1294; H01M 10/613; H01M 10/1252; H01M 2/1077; H01M 2/1061; H01M 2/1066; H01M 10/65; H01M 10/6561–10/6567; H01M 10/6554–10/6557; B60L 11/1874; B60L 11/1877
  See application file for complete search history.

(56) References Cited

U.S. PATENT DOCUMENTS

2009/0191452 A1* 7/2009 Anantharaman ....... H01M 6/42
                                                              429/120
2009/0325051 A1* 12/2009 Niedzwiecki ......... F28F 9/0275
                                                              429/120
2010/0052692 A1* 3/2010 Yano .................... H01M 2/1083
                                                              324/427
2010/0310909 A1* 12/2010 Yun ....................... H01M 2/206
                                                              429/90
2013/0089763 A1* 4/2013 Lee ..................... H01M 2/0245
                                                              429/71
2013/0330579 A1* 12/2013 Ejiri .................... H01M 2/1061
                                                              429/53

FOREIGN PATENT DOCUMENTS

JP          2008-269985 A     11/2008
JP          2013-145686 A     7/2013
KR       10-2006-0037605 A    5/2006
KR       10-2013-0011370 A    1/2013

OTHER PUBLICATIONS

European Search Report dated Sep. 29, 2015, for corresponding European Patent Application No. 15154451.7 (8 pages).
EPO Office Action dated Mar. 29, 2017, for corresponding European Patent Application No. 15154451.7 (7 pages).
SIPO Office Action, with English translation, dated May 28, 2018, for corresponding Chinese Patent Application No. 201510066900.0 (14 pages).

* cited by examiner

BATTERY PACK

CROSS-REFERENCE TO RELATED APPLICATION

This application claims priority to and the benefit of Korean Patent Application No. 10-2014-0014800, filed on Feb. 10, 2014 in the Korean Intellectual Property Office, the content of which is incorporated herein by reference in its entirety.

BACKGROUND

1. Field

An aspect of embodiments of the present invention relates to a battery pack.

2. Description of the Related Art

In general, battery cells are used as energy sources for mobile devices, electric vehicles, hybrid vehicles, and the like. The shape of the battery cell is variously changed depending on the kind of external device to which the battery cell is applied.

In an application in which long-time driving and high-power driving are required in an electric vehicle or hybrid vehicle which consumes a large amount of power, a large-capacity battery module is configured by electrically coupling a plurality of battery cells to each other in order to increase power and capacity. The output voltage or output current of the battery module may be increased according to the number of battery cells included in the battery module. In addition, a battery pack may be configured by electrically coupling such battery modules.

However, the high-power and large-capacity battery pack generates a large amount of heat during a charging/discharging process thereof. Therefore, the battery pack should easily dissipate heat generated in each battery cell. To this end, a cooling system is formed in the high-power and high-capacity battery pack. In the cooling system, a refrigerant, such as air, flows in the battery pack at one side of the battery pack and is then exhausted to an outside of the battery pack at another side of the battery pack, thereby lowering the temperature inside the battery pack.

SUMMARY

Aspects of embodiments of the present invention provide a battery pack in which, when the battery pack is cooled using air as a refrigerant, the flow of the air can be changed or varied so that the air flows along a side of a battery cell and then moves to a bottom of the battery cell.

Aspects of embodiments of the present invention also provide a battery pack in which, when the battery pack includes battery modules arranged along two lines with every two battery cells positioned in parallel, air flows so that each battery cell is separately cooled, thereby improving the cooling efficiency of the battery pack.

According to an embodiment of the present invention, there is provided a battery pack including: at least one battery module including a plurality of battery cells arranged along one direction and barriers positioned between adjacent ones of the plurality of battery cells, the plurality of battery cells being electrically coupled to each other; and a housing accommodating the at least one battery module therein, the housing having inlets at opposite edges of a first end of the housing at one end of the at least one battery module, and an outlet at a lower portion of a second end of the housing at an opposite end of the at least one battery module, wherein each barrier includes a base portion facing an adjacent one of the battery cells, an upper spacer at at least one top corner of the base portion, and a lower spacer at at least one bottom corner of the base portion, and wherein sides and a bottom of the at least one battery module are spaced from the housing.

The housing and the barriers may be configured to accommodate a refrigerant flowing into the housing through the inlets of the housing, flowing from the refrigerant from the side of each battery cell to the bottom of each battery cell, and being exhausted to an outside of the housing through the outlet of the housing.

The upper and lower spacers of the barrier may have a thickness such that the upper spacer may contact a side surface and a top surface of both battery cells that are adjacent to the respective barrier, and the lower spacer may contact the side surface and a bottom surface of both battery cells that are adjacent to the respective barrier.

The battery pack may further include first and second end plates, and the first and second end plates may respectively be at opposite ends of the at least one battery module.

The first end plate may face the first end of the housing, and the first end plate may have a pair of side groove portions at positions respectively corresponding to the inlets in the first end of the housing.

The second end plate may face the second end of the housing, and the second end plate may have a bottom groove portion at a position corresponding to the outlet in the second end of the housing.

The base portion of the barrier may include at least one rib protruded from the base portion.

The at least one rib may be curved from one edge of the base portion toward a bottom edge of the base portion.

The at least one rib may include a plurality of ribs, and the ribs may be spaced from each other at an interval.

The interval between the ribs may gradually increase as the ribs approach a top of the base portion.

The ribs may be dots.

Two battery modules may be accommodated in the housing and one side surface of a first battery module may face a side surface of a second battery module, and a blocking plate may be configured to block movement of a refrigerant between the first and second battery modules is between the first and second battery modules.

The blocking plate may include upper and lower support portions respectively at a top and bottom of the blocking plate.

According to aspects of embodiments of the present invention, the flow of the air for cooling the battery cell in the battery pack is changed or varied so that the air flows along the side of the battery cell and then moves to the bottom of the battery cell, thereby optimizing the space of the battery pack.

Further, a difference in temperature and pressure between the respective battery cells is improved even though a relatively small amount of refrigerant is used, so that it is possible to reduce the operation of a cooling fan, thereby improving the lifespan of the cooling fan and the battery pack.

BRIEF DESCRIPTION OF THE DRAWINGS

Example embodiments will now be described more fully hereinafter with reference to the accompanying drawings; however, the present invention may be embodied in different forms and should not be construed as limited to the embodiments set forth herein. Rather, these embodiments are provided so that this disclosure will be thorough and complete and will fully convey the scope of the disclosure to those skilled in the art.

In the figures, dimensions may be exaggerated for clarity of illustration. It will be understood that when an element is referred to as being "between" two elements, it can be the only element between the two elements or one or more intervening elements may also be present. Like reference numerals refer to like elements throughout.

DETAILED DESCRIPTION

Figure 1:
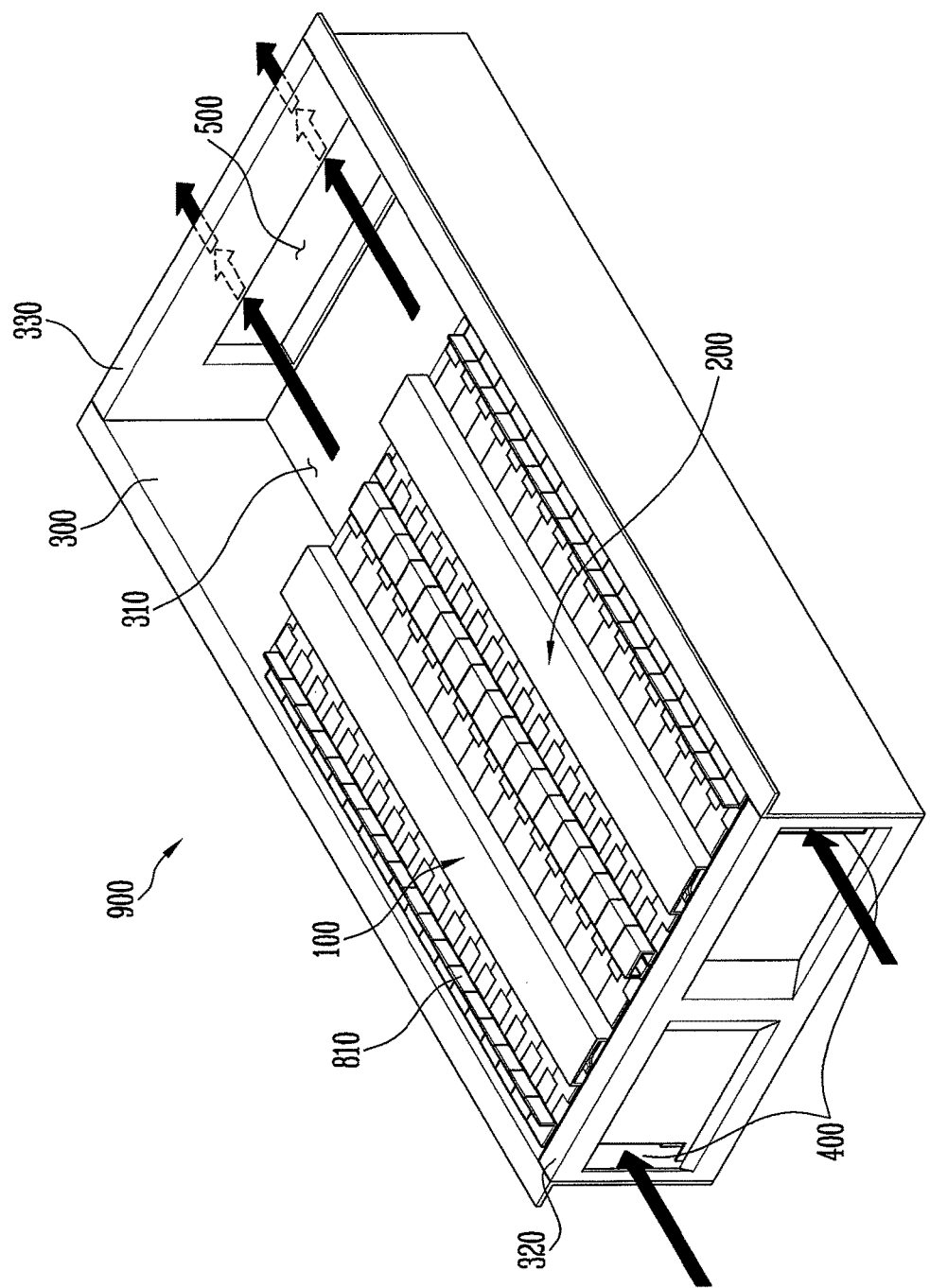
FIG. 1 is a perspective view showing a battery pack according to an embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more additional elements interposed therebetween. Also, when an element is referred to as being "connected to" or "coupled to" another element, it can be directly connected to or coupled to the other element or be indirectly connected to or coupled to the other element with one or more additional elements interposed therebetween. Hereinafter, like reference numerals refer to like elements. In the drawings, the thickness or size of layers are exaggerated for clarity and not necessarily drawn to scale. Furthermore, the use of "may" when describing embodiments of the present invention refers to "one or more embodiments of the present invention."

FIG. 1 is a perspective view showing a battery pack according to an embodiment of the present invention.

Referring to FIG. 1, the battery pack 900 according to an embodiment of the present invention includes one or more battery modules 100 and 200 and a housing 300 configured to accommodate the battery modules 100 and 200 therein.

In this embodiment, each of the battery modules 100 and 200 includes a plurality of battery cells 110 (see FIG. 2) arranged along one direction to be electrically coupled to (e.g., electrically connected to) each other and barriers 810 (see FIG. 4A) respectively positioned between the plurality of battery cells 110 (e.g., respectively positioned between adjacent ones of the plurality of battery cells 110). In addition, first and second end plates 600 and 700 (see FIG. 2) are respectively positioned adjacent to the battery cells 110 at both ends of the battery module.

The housing 300 has a pair of inlets 400 respectively formed at both sides of a first end 320 (e.g., a first surface) of the housing 300 that faces end portions of the battery modules 100 and 200 (e.g., the inlets 400 respectively face end portions of the battery modules 100 and 200) and an outlet 500 formed at a lower portion of a second end 330 (e.g., a second surface) of the housing 300 that faces other end portions of the battery modules 100 and 200 (e.g., the outlet 500 faces opposite end portions of the battery modules 100 and 200). In addition, a space portion 310 in which electronic components including, for example, a circuit and the like are accommodated may be formed inside the housing 300 at the side where the outlet 500 is formed.

The housing 300 is formed in a shape where a top of the housing 300 is opened. The battery pack may be manufactured by accommodating the battery modules 100 and 200 and the electronic components including the circuit and the like in the housing 300 and then coupling (e.g., fastening) a top cover to the top of the opened housing 300. In this case, the two battery modules 100 and 200 are accommodated inside the housing 300. In one embodiment, the first and second battery modules 100 and 200 are in the housing 300 at an interval so that one surface of the first battery module 100 and the other surface of the second battery module 200 face each other (e.g., the battery modules 100 and 200 may be positioned in the housing 300 at an interval such that the battery cells 110 of each of the battery modules 100 and 200 are arranged parallel with each other).

Each of the barriers 810 respectively positioned between the battery cells 110 includes a base portion 816 (see FIG. 4A) opposite to the battery cell 110 (e.g., facing a side surface of the battery cell 110), an upper spacer 811 (see FIG. 4A) protruding from a top, side edge of the base portion 816, and a lower spacer 813 (see FIG. 4A) protruding from a bottom, side edge of the base portion 816.

Accordingly, when a respective one of the battery cells 110 and the barrier 810 are coupled to each other, one side portion (e.g., a longer side) of the first battery module 100, one side portion (e.g., a longer side) of the second battery module 200, and bottom portions of the first and second battery modules 100 and 200 are spaced from the housing 300 at an interval. The barrier 810 will be described in further detail below with reference to FIGS. 4A to 4C.

Generally, in a housing accommodating one battery module therein, air flows into the housing at one side of a battery cell and is exhausted at another side of the housing opposite to the one side of the battery cell, thereby cooling the battery cell (e.g., the air flows in a direction from one side of a battery cell to an opposite side of the battery cell).

However, according to embodiments of the present invention, when the two battery modules are accommodated in the housing, the length from one side of the battery module to another side opposite to the one side of the battery module is lengthened (e.g., an air flow path from one side of the battery module to an opposite side of the battery module is lengthened). Therefore, the cooling performance of the battery pack may be reduced, and pressure inside the battery pack may be increased. Accordingly, when the battery pack is cooled by increasing the operation of a cooling fan, the lifespan of the cooling fan and the battery pack may be reduced. When the two battery modules are vertically aligned in order to solve such a problem, the entire height of the battery pack is increased.

According to embodiments of the present invention, the positions of the inlet 400 and the outlet 500 of the housing 300 are changed and the barrier 810 positioned between respective the battery cells 110 is formed to space the battery cells 110 from side and lower surfaces of the housing 300 at an interval. In one embodiment, the base portion 816 (see FIG. 4A) of the barrier 810 may include at least one rib 817 (see FIG. 4A) protruded from the base portion 816 to allow the battery cell 110 and the barrier 810 to be spaced from each other at an interval.

As such, a refrigerant (e.g., air) flowing into the housing 300 through the pair of inlets 400 respectively formed at both sides of the first end 320 of the housing 300 flows in (or through) each of the battery modules 100 and 200 along an outer side of the respective battery module. Then, the air moves to the lower surface of each of the battery modules 100 and 200 to be exhausted to the outside of the housing 300 through the outlet 500 formed at the lower portion of the second end 330 of the housing 300.

The battery pack 900 according to one embodiment of the present invention may be used in a vehicle, and the temperature of the battery cells 110 is controlled using the air as the refrigerator in order to cool the battery pack 900. In one embodiment, a flow direction of the air is changed so that the air flowing along the side of the battery cell 110 is exhausted at the bottom of the battery cell 110, thereby optimizing a space of the battery pack 900.

Figure 2:
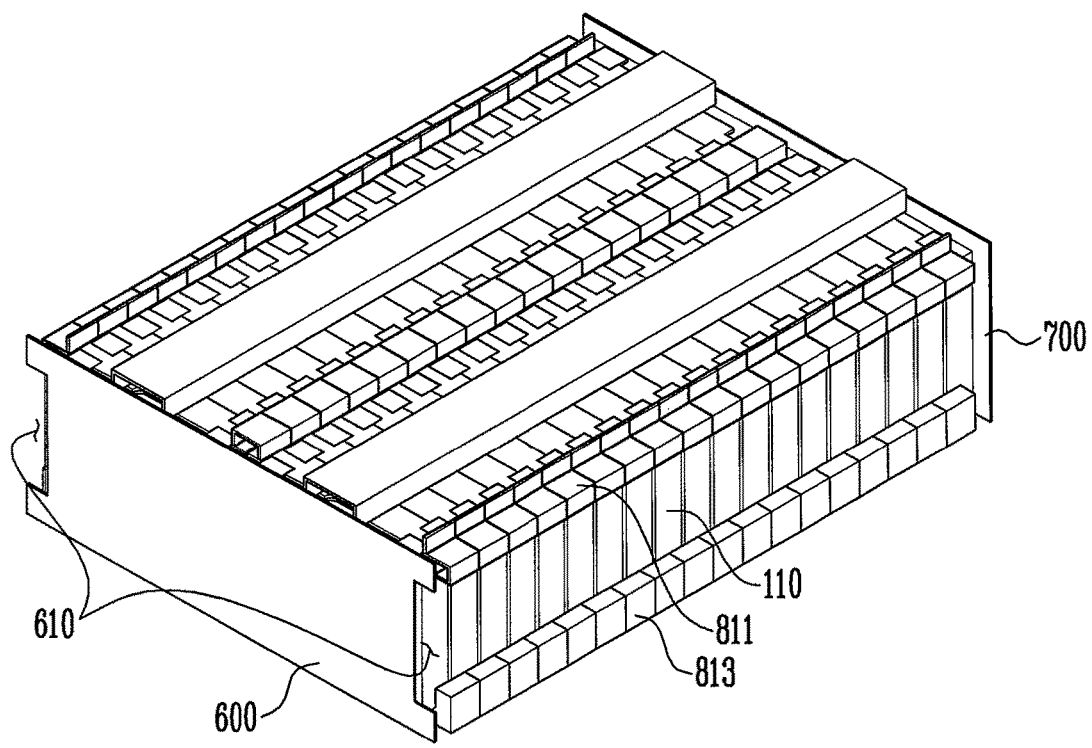
FIG. 2 is a perspective view showing a battery module according to an embodiment of the present invention.
Figure 3A:
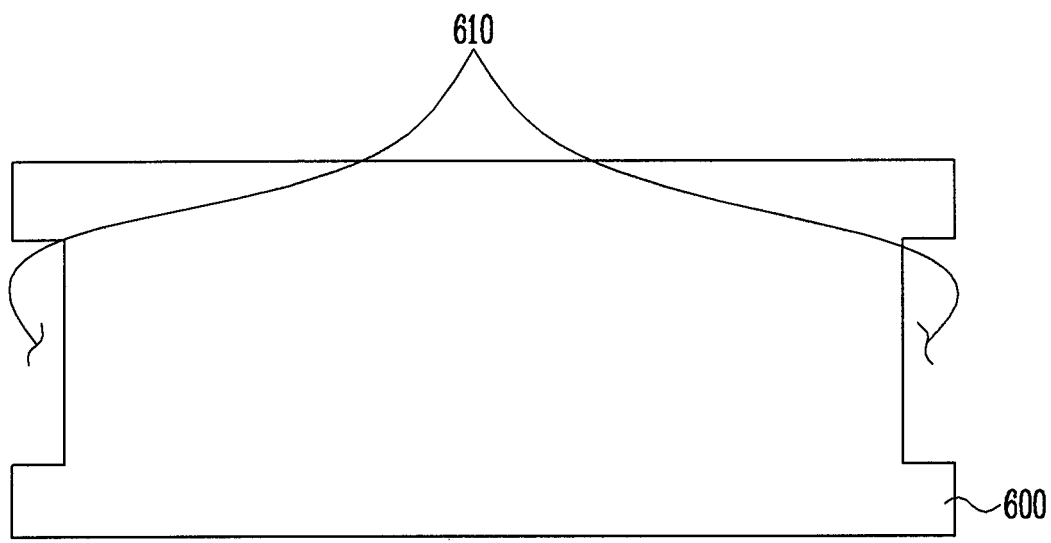
FIG. 3A is a view showing a first end plate according to an embodiment of the present invention.
Figure 3B:
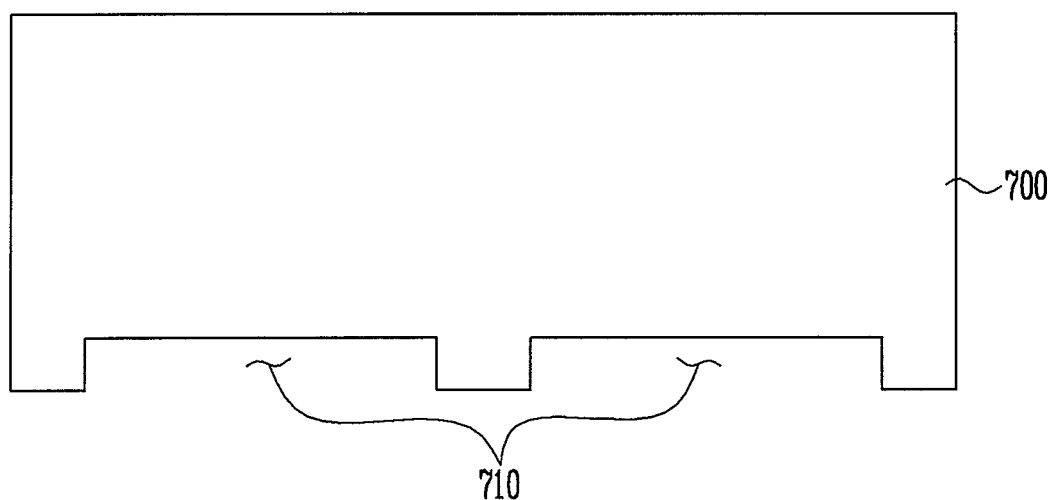
FIG. 3B is a view showing a second end plate according to an embodiment of the present invention.

FIG. 2 is a perspective view showing the battery module according to an embodiment of the present invention. FIG. 3A is a view showing a first end plate according to an embodiment of the present invention. FIG. 3B is a view showing a second end plate according to an embodiment of the present invention.

Referring to FIGS. 2 to 3B, the first and second battery modules 100 and 200 are arranged so that respective sides of the first and second battery modules 100 and 200 are adjacent to each other (e.g., the battery cells 110 of the battery modules 100 and 200 are aligned with each other), and a pair of end plates including the first and second end plates 600 and 700 are at both end portions of the first and second battery modules 100 and 200. The first and second end plates 600 and 700 are positioned to be in surface contact with first and second ends 600 and 700 of the housing 300, respectively, so that the plurality of battery cells 110 can be pressed inward (i.e., compressed together) by a fastening member, etc.

In one embodiment, referring to FIG. 1, the first end plate 600 faces the first end 320 of the housing 300 and may have a pair of side groove portions 610 respectively formed at positions corresponding to the inlets 400 formed in the first end 320.

The second end plate 700 faces the second end 330 of the housing 300 and may have a bottom groove portion 710 formed at a position corresponding to the outlet 500 formed in the second end 330. In this embodiment, the bottom groove portion 710, as shown in FIG. 3B, may be configured with groove portions respectively corresponding to (e.g., formed at) the sides of the first and second battery modules 100 and 200. However, it will be apparent that the bottom groove portion 710 may be configured with one groove portion (e.g., a single groove portion) formed to correspond to the outlet 500.

As such, the air that flows into the housing 300 through the side groove portions 610 formed in the first end plate 600 and the inlet 400 can be smoothly moved from the side of the battery cell 110 to the bottom of the battery cell 110 and exhausted from the housing 300 by the bottom groove portion 710 formed in the second end plate 700.

Barriers 810 are respectively positioned between the battery cells 110 of the battery modules 100 and 200 (e.g., barriers 810 are respectively positioned between adjacent ones of the battery cells 110). The barrier 810 includes the base portion 816 (see FIG. 4A) opposite to (e.g., facing) the battery cell 110, the upper spacer 811 protruded to at least one side, top portion of the base portion 816, and the lower spacer 813 protruded from at least one side, bottom portion to one area of a lower surface of the base portion 816.

The upper and lower spacers 811 and 813 have a thickness with respect to a side surface of the battery cell 110 so as to contact side and lower surfaces of both adjacent battery cells 110. That is, the upper and lower spacers 811 and 813 surround at least a portion of the battery cell 110, and one side portion and bottom portion of the first and second battery modules 100 and 200 are spaced from the housing 300 (see FIG. 1) at an interval.

In this embodiment, a blocking plate 818 (see FIG. 4A) is formed in the barrier 810 and positioned between the other side portions where the first and second battery modules 100 and 200 are opposite to each other (e.g., the blocking plate 818 is between the base portions 816 that contact the respective battery modules 100 and 200). In addition, upper and lower support portions 819 and 815 are respectively formed at a top and bottom of the blocking plate 818. Accordingly, it is possible to prevent the refrigerant from moving between the first and second battery modules 100 and 200.

Hereinafter, the battery module will be briefly described by taking the first battery module 100 as an example.

The first battery module 100 includes a plurality of battery cells 110 aligned along one direction, barriers 810 respectively positioned between the battery cells 110, and first and second end plates 600 and 700 respectively positioned at both ends (e.g., opposite ends) of the plurality of battery cells 110 (e.g., opposites ends of the first battery module 100). In this embodiment, the battery cells 110 are aligned in parallel so that wide, front surfaces of the battery cells 110 are opposite to (e.g., face) each other. In addition, positive and negative electrode terminals of two adjacent battery cells 110 may be electrically coupled to (e.g., electrically connected to) each other through a bus-bar.

Each battery cell 110 may be manufactured by accommodating an electrode assembly and an electrolyte in a case and then sealing the case with a cap plate. The cap plate may be provided with a positive electrode terminal, a negative electrode terminal, and a vent formed between the terminals. The electrode assembly may include a positive electrode plate, a negative electrode plate, and a separator interposed between the positive and negative electrode plates. In this embodiment, the positive electrode plate is coupled to (e.g., connected to) the positive electrode terminal, and the negative electrode plate is coupled to the negative electrode terminal to transfer energy generated through an electrochemical reaction between the electrode assembly and the electrolyte to the outside of the battery cell 110. The vent acts as a path through which excess gas generated inside the battery cell 110 is exhausted to the outside of the battery cell 110.

Figure 4A:
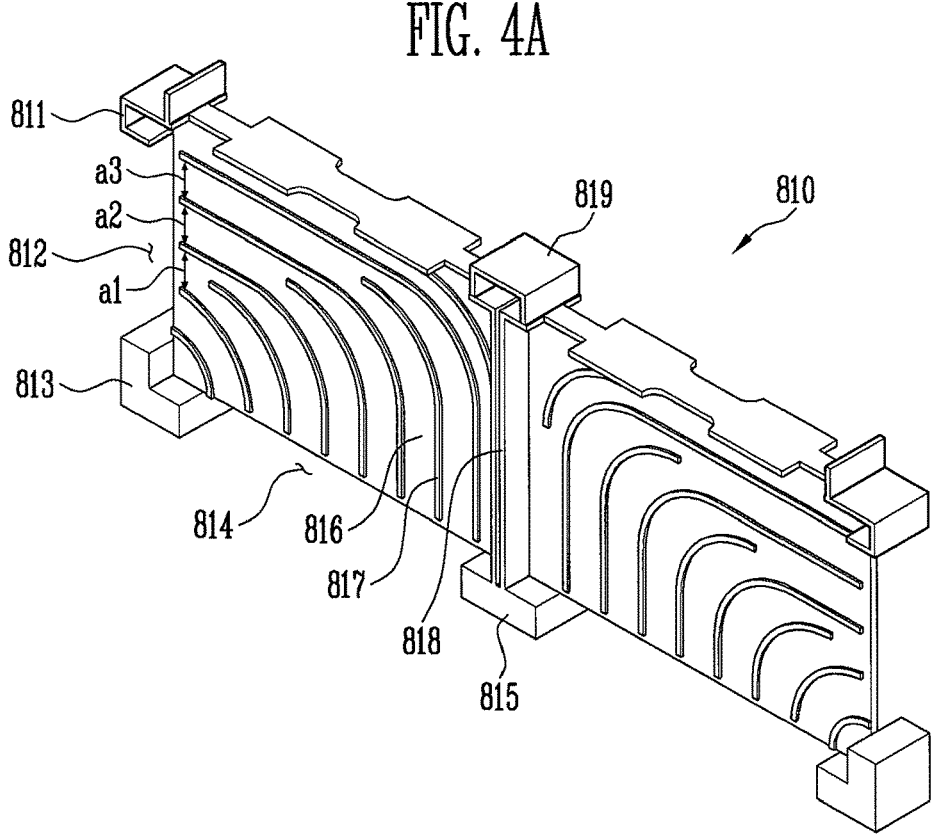
FIG. 4A is a perspective view showing a barrier according to an embodiment of the present invention.

FIG. 4A is a perspective view showing a barrier according to an embodiment of the present invention.

Referring to FIG. 4A, the barrier 810 is provided between the battery cells 110. The barrier 810 includes the base portion 816 opposite to the battery cell 110, the upper spacer 811 protruded to at least one side, top portion of the base portion 816, and the lower spacer 813 protruded from at least one side, bottom portion to be below the bottom surface of the base portion 816. The upper and lower spacers 811 and 813 have a thickness to contact side and bottom surfaces of both adjacent battery cells 110.

The blocking plate 818 for blocking movement of the refrigerant between the first and second battery modules 100 and 200 is formed at a middle area of the barrier 810 (e.g., the barrier 810 is positioned between the first and second battery modules 100 and 200). In addition, the upper and lower support portions 819 and 815 are respectively formed at the top and bottom of the blocking plate 818.

A side space portion 812 is formed between the upper and lower spacers 811 and 813, and a lower space portion 814 is formed between the lower spacer 813 and the lower support portion 815. In other words, because the upper spacer 811, the lower spacer 813, the upper support portion 819, and the lower support portion 815 are formed in the barrier 810, the side and bottom portions of the first and second battery modules are spaced from the housing 300 at an interval. Accordingly, the refrigerant flows into the housing 300 through the inlet 400, flows through the first and second battery modules 100 and 200 along sides of the first and second battery modules 100 and 200, and then moves to the bottom surface of each of the first and second battery modules 100 and 200 to be exhausted to the outside of the housing 300 through the outlet 500.

The movement of the refrigerant between the first and second battery modules 100 and 200 is blocked by the blocking plate 818 so that the movement path of the refrigerant can be shortened, thereby improving the cooling efficiency of the battery pack. Accordingly, it is possible to easily cool the battery pack using a lower specification cooling fan (e.g., a cooling fan with a relatively low flow rate).

The base portion 816 of the barrier 810 includes at least one rib 817 protruded from the base portion 816 so that the refrigerant is movable by allowing the battery cell 110 and the barrier 810 to be spaced from each other at an interval. In this embodiment, the at least one rib 817 is bent (e.g., curved) toward a lower portion of the base portion 816 from one side portion of the base portion 816, and the bent portion is formed in a curved line. In other words, the rib 817 is formed to be bent in a curved line toward the lower space portion 814 from the side space portions 812 respectively formed at both sides of the barrier 810. In this embodiment, the rib 817 may be formed as a plurality of ribs (e.g., the base portion 816 may include a plurality of ribs 817) and spaced from each other at an interval.

Figure 4B:
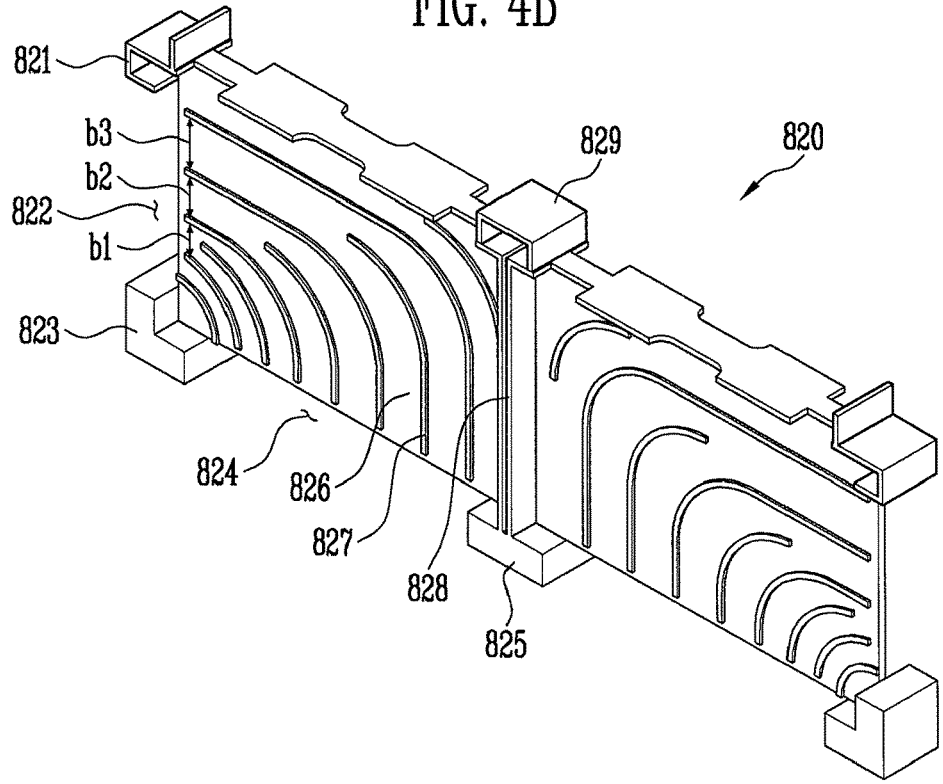
FIG. 4B is a perspective view showing a barrier according to another embodiment of the present invention.

FIG. 4B is a perspective view showing a barrier according to another embodiment of the present invention.

Referring to FIG. 4B, a base portion 826 of the barrier 820 includes at least one rib 827 protruded from the base portion 826 so that the refrigerant is movable by allowing the battery cell 110 and the barrier 820 to be spaced from each other at an interval.

In this embodiment, the at least one rib 827 is bent (e.g., curved) toward a lower portion of the base portion 826 from one side portion of the base portion 826, and the bent portion is formed in a curved line. In this embodiment, the rib 827 may be formed with a plurality of ribs (e.g., the base portion 826 may include a plurality of ribs 827), and the interval between the ribs is gradually widened as the ribs approach the top of the base portion 826. That is, the interval between the ribs may be formed as b1<b2<b3. Accordingly, the entire flow of the refrigerant in the battery pack can be uniform.

An upper spacer 821, a side space portion 822, a lower spacer 823, a lower space portion 824, a lower support portion 825, and a blocking plate 828, are substantially the same as or identical to those of FIG. 4A, and therefore, their detailed descriptions may be omitted.

Figure 4C:
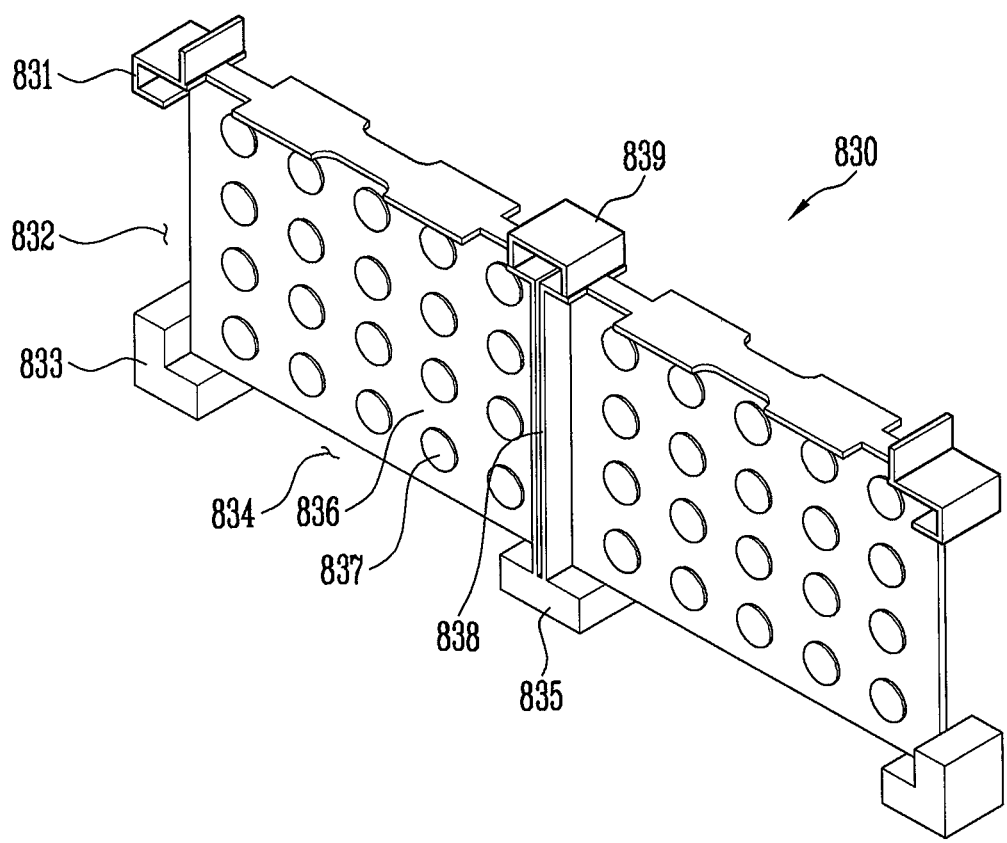
FIG. 4C is a perspective view showing a barrier according to still another embodiment of the present invention.

FIG. 4C is a perspective view showing a barrier according to still another embodiment of the present invention.

Referring to FIG. 4C, a base portion 836 of the barrier 830 includes one or more ribs 837 protruded from the base portion 836 to allow the battery cell 110 and the barrier 830 to be spaced from each other at an interval. In this embodiment, the one or more ribs 837 are formed in a dot shape to be spaced from each other at an interval (e.g., the ribs 837 are dots that are spaced from each other).

As such, even when the rib 837 is formed in a dot shape, the flow of air is changed so that the air that flows along the side of the battery cell 110 moves to the bottom of the battery cell 110, thereby efficiently cooling the battery pack.

An upper spacer 831, a side space portion 832, a lower spacer 833, a lower space portion 834, a lower support portion 835, and a blocking plate 838, are substantially the same as or identical to those of FIG. 4A, and therefore, their detailed descriptions may be omitted.

Figure 5:
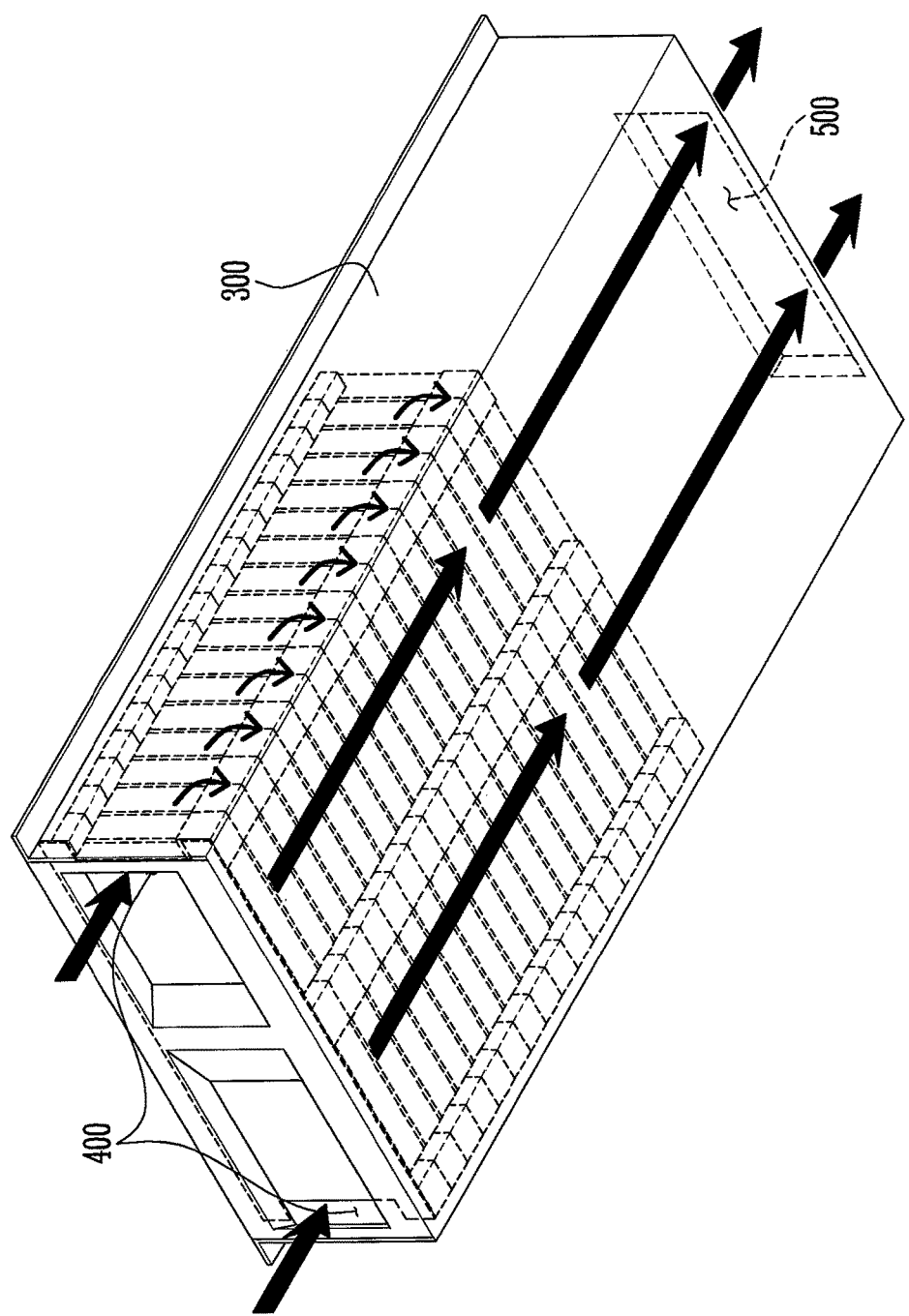
FIG. 5 is a bottom view showing the flow of a refrigerant in the battery pack according to an embodiment of the present invention.

FIG. 5 is a bottom view showing the flow of a refrigerant in the battery pack according to an embodiment of the present invention.

Referring to FIG. 5, the battery pack 900 according to an embodiment of the present invention includes the plurality of battery cells 110 aligned along one direction, the plurality of battery cells 110 being electrically coupled to each other, and two battery modules 100 and 200 configured to have barriers 810 respectively positioned between the plurality of battery cells 110. The battery pack 900 according to an embodiment of the present invention further includes the housing 300 configured to accommodate the two battery modules 100 and 200 therein.

The inlets 400 are respectively formed at both sides of the first end 320 of the housing 300 which faces respective end portions of the battery modules 100 and 200, and the outlet 500 is formed at a lower portion of the second end 330 of the housing 300 which faces opposite respective end portions of the battery modules 100 and 200.

The barrier 810, positioned between the battery cells 110, includes the base portion 816 opposite to the battery cell 110, the upper spacer 811 protruded to at least one side, top portion of the base portion 816, and the lower spacer 813 protruded from at least one side, bottom portion to be below the base portion 816. Accordingly, side and bottom portions positioned at the periphery of the battery modules 100 and 200 are spaced from the housing 300 at an interval.

In other words, in embodiments of the present invention, the temperature of the battery cell 110 is controlled using air to cool the battery pack 900. In this case, the flow direction of the air is changed so that the air flows along the side of the battery cell 110 and is exhausted at the bottom of the battery cell 110, thereby optimizing a space of the battery pack.

The direction of the air is guided toward the side surface of the battery cells 110 from the inlet 400 of the housing 300 and then changed toward the bottom of the battery cell 110 while passing along each battery cell 110. As such, the air passes along the bottom of each battery cell 110 and is then exhausted to the outside of the housing 300 through the outlet 500, thereby cooling the battery cells 110.

In this embodiment, the plurality of ribs 817 are formed on the base portion 816 of the barrier 810 positioned between the battery cells 110. The rib 817 is bent toward a lower portion of the base portion 816 from one side portion of the base portion 816 (e.g., a side positioned at the periphery of the base portion 816), and the bent portion is formed in a curved line. In addition, the blocking plate 818 is formed in the barrier 810 between the first and second battery modules 100 and 200 to block the air from being mixed between the first and second battery modules 100 and 200.

Accordingly, it is possible to reduce or minimize the space for simultaneously (or concurrently) cooling the battery cells arranged along two lines and to decrease the pressure in the battery pack 900. In a comparative battery pack including two or more battery modules, when the battery modules are vertically disposed, the entire height of the battery pack is increased. In a comparative battery pack including two battery modules in which a rib structure or blocking plate of a barrier is not formed, the width of the barrier is widened, and hence, it is difficult to cool battery cells.

Accordingly, in the battery pack 900 according to an embodiment of the present invention, the air flows into the housing at the side of the battery cell 110 and then moves to the bottom of the battery cell 110 to be exhausted to the outside of the battery pack so that it is possible improve the cooling efficiency of the battery pack and to optimize the space of the battery pack 900.

Although it has been described herein in regards to embodiments of the present invention that the air flows along the side of the battery module and is then exhausted at the bottom of the battery module, it will be apparent that the air may flow along the bottom of the battery module and then be exhausted at the side of the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A battery pack comprising:
   a plurality of battery modules, each of the battery modules comprising a plurality of battery cells arranged along a first direction and barriers positioned between adjacent ones of the plurality of battery cells, the plurality of battery cells being electrically coupled to each other;
   a housing accommodating the battery modules therein, the housing having inlets at opposite edges of a first end of the housing at a first end of the battery modules, and an outlet at a lower portion of a second end of the housing at a second end of the battery modules, the first and second ends of the housing being opposite each other in the first direction, the first and second ends of the battery modules being opposite each other in the first direction; and
   first and second end plates respectively at the first and second ends of the battery modules and between the battery modules and the housing,
   wherein each barrier comprises a base portion facing an adjacent one of the battery cells, an upper spacer at at least one top corner of the base portion, and a lower spacer at at least one bottom corner of the base portion,
   wherein sides and a bottom of the battery modules are spaced from the housing,
   wherein the first end plate has a pair of side groove portions at positions respectively aligned with the inlets in the first end of the housing in the first direction and extending from a first surface of the first end plate facing the first end of the housing to a second surface of the first end plate facing the second end of the housing,
   wherein the second end plate has a bottom groove portion at a position aligned with the outlet in the second end of the housing in the first direction and extending from a first surface of the second end plate facing the first end of the housing to a second surface of the second end plate facing the second end of the housing, and
   wherein one side surface of a first battery module of the battery modules faces a side surface of a second battery module of the battery modules, and a blocking plate is between the first and second battery modules, the blocking plate being configured to block movement of a refrigerant between the first and second battery modules.

2. The battery pack of claim 1, wherein the base portion of the barrier comprises at least one rib protruded from the base portion.

3. The battery pack of claim 2, wherein the at least one rib is curved from one edge of the base portion toward a bottom edge of the base portion.

4. The battery pack of claim 3, wherein the at least one rib comprises a plurality of ribs, and the ribs are spaced from each other at an interval.

5. The battery pack of claim 4, wherein the interval between the ribs gradually increases as the ribs approach a top of the base portion.

6. The battery pack of claim 2, wherein the at least one rib comprises a plurality of ribs, and the ribs are dots.

7. The battery pack of claim 1, wherein the housing and the barriers are configured to accommodate a refrigerant flowing into the housing through the inlets of the housing, flowing from the side of each battery cell to the bottom of each battery cell, and being exhausted to an outside of the housing through the outlet of the housing.

8. The battery pack of claim 1, wherein the upper and lower spacers of the barrier have a thickness such that the upper spacer contacts a side surface and a top surface of both battery cells that are adjacent to the respective barrier, and the lower spacer contacts the side surface and a bottom surface of both battery cells that are adjacent to the respective barrier.

9. The battery pack of claim 1, wherein the blocking plate comprises upper and lower support portions respectively at a top and bottom of the blocking plate.

* * * * *